United States Patent [19]
Change

[11] Patent Number: 5,909,367
[45] Date of Patent: Jun. 1, 1999

[54] MODULAR AC-AC VARIABLE VOLTAGE AND VARIABLE FREQUENCY POWER CONVETER SYSTEM AND CONTROL

[75] Inventor: Jie Change, Thousand Oaks, Calif.

[73] Assignee: Reliance Electric Industrial Company, Cleveland, Ohio

[21] Appl. No.: 08/867,035

[22] Filed: Jun. 2, 1997

[51] Int. Cl.$^6$ .................................................. H02M 5/293
[52] U.S. Cl. ............................................................ 363/163
[58] Field of Search .................................... 363/157, 159, 363/160, 163, 164, 165

[56] References Cited

U.S. PATENT DOCUMENTS

| | | | |
|---|---|---|---|
| 4,468,725 | 8/1984 | Venturini | 363/160 |
| 4,628,425 | 12/1986 | Venturini et al. | 363/10 |
| 4,697,230 | 9/1987 | Neft | 363/163 |

*Primary Examiner*—Adolf Deneke Berhane
*Attorney, Agent, or Firm*—Mark S. Svat; John J. Horn; John M. Miller

[57] ABSTRACT

An AC—AC multi-module matrix PWM converter includes one to a plurality of phase banks within which are provided architecturally identical basic circuit modules of single phase output AC—AC matrix converters. Each basic converter module includes three-phase AC inputs and two output terminals. The modules may then be interconnected in series or parallel with other modules within a phase bank to increase the output voltage or current respectively of the phase bank. The differential power module structure and the differential phase PWM modulation scheme increases the output voltage by 15.5% in comparison with 120° phase modulation. Individually designed and tested phase banks can be further connected to a higher power symmetric three phase system or multiphase system for various AC load and AC motor controls. The modular structure permits standardization of the power electronics design and manufacture at system level. The modular design permits using power components at lower voltage or current rating with low cost while obtaining higher power output through module integration.

20 Claims, 13 Drawing Sheets

MODULAR AC-AC VARIABLE VOLTAGE AND VARIABLE FREQUENCY POWER CONVETER SYSTEM AND CONTROL

BACKGROUND OF THE INVENTION

The present invention relates to power conversion and more specifically to an improved AC—AC power converter for use in conjunction with AC loads having high power requirements.

AC—AC converters are static power converters which change a fixed voltage and fixed frequency AC power source into an output AC power source having variable voltage and variable frequency (VVVF) in a controlled manner. Unlike a voltage source or current source inverter which will first convert the AC input power to a DC power and then reconvert the DC power back to VVVF AC power output, AC—AC converters perform the AC—AC power change in a one-stage conversion without using any energy storage components in a DC-link. Such AC—AC conversion is a highly efficient power conversion.

In AC—AC PWM converters, self-turn-off static power devices are used to form bi-lateral switches for each input phase. A circuit of this type which consists of 9 bi-lateral switches $S_1$–$S_9$ is provided in FIG. 1. This circuit is also known as a matrix converter since it provides one switch for each of the possible connections between the input and output AC lines.

In existing AC—AC matrix converters, a bi-lateral switch consists of a current steering diode bridge and a power transistor device as shown in FIG. 1. Although each of the bi-lateral switches has only one switching device and four fast recovery power diodes, special care in the load current commutation is needed. A dead-time insertion is typically employed between turning the switch off in the outgoing phase and turning the switch on in the incoming phase, to prevent a short circuit between the outgoing and incoming phases. The dead-time is typically in proportion to the device current and voltage rating. During the dead-time period, the load is electrically open circuit from the power source due to both the outgoing and incoming devices are off and the normal current flow is interrupted. This causes a high voltage spike across the switching devices due to the load and line side inductances. Large sized snubber capacitors are needed to suppress the transient voltage spikes to protect the switching devices. This increases the converter switching losses and unit cost.

Another drawback of the existing configuration of the three-phase matrix converters is that their output power rating is dictated and limited by the commercial availability of the power switching devices.

Alternatively, FIG. 2 shows a power converter topology which is able to provide equivalent functions by the combination of a PWM rectifier bridge and a PWM inverter bridge circuit. The DC link capacitor values can be reduced by coordination of the PWM rectifier and PWM inverter switching. However, there exists an explicit DC link stage in this power circuit. The output power rating is also limited by the commercial availability of the power devices.

Practically, due to the limits of the device ratings of components used for the forced commutation PWM converters in FIGS. 1 and 2, it is not possible to produce feasible converters which meet very high power (high voltage and high current) requirements. For instance, known switching techniques in forced commutation employ IGBT devices. While use of such devices have many benefits, IGBT based conventional power converter design is commercially practicable only within a limited power rating. This is due to the IGBT and associated passive components which can withstand higher voltage and current, for example for 920 V to 6600 V application, are either not readily available or not cost effective.

Additionally, in many industrial settings products will have power ratings which vary from a low to a very high power. For example, in an industrial setting a load may be a 400 kilowatts machine, however, in another industrial setting a piece of equipment may require over 10,000 kilowatts to operate. Therefore, for a manufacturer to supply such a wide range of requirements it is necessary to have a wide variety of AC—AC converters with different power ratings. Such a situation is very expensive not only due to the construction costs of so many varied units but also in maintaining and stocking so many different components. Particularly, each different unit needs to be individually designed, and thoroughly tested and debugged. Further expenses are incurred due to developmental cost and design time which each unit needs. All the above drawbacks raise the cost of supplying such converters.

It is therefore an object of the present invention to provide a multi-modular structure which increases the ease of development, manufacture, testing, and field service by utilizing commonly available and field proven power components having low voltage ratings to replace a wide variety of and expensive high voltage active power devices and passive components.

It is a further object of the present invention to provide direct AC—AC power conversion with low switching losses, thus increasing the conversion efficiency and reducing the physical size of the converter, thereby eliminating the front end rectifier, DC-link and precharge circuitry in a traditional AC-DC-AC power conversion.

It is yet another object of the present invention to provide inherent power regeneration for true four quadrant operation of an AC drive, provide, especially for large horse power requirements, low harmonic distortion on both line side and motor side.

SUMMARY OF THE INVENTION

The present invention originates a multi-module AC—AC power converter which converts multi-phase fixed voltage and fixed frequency power to single-phase or multi-phase variable voltage and variable frequency power. The multi-module AC—AC power converter includes one to a plurality of phase banks, which in turn include a plurality of single-phase matrix converter modules. Each single-phase matrix converter module includes three AC input terminals which receive inputs from a fixed voltage and fixed frequency isolated three-phase power supply. Each single-phase matrix converter module includes switching configurations which generate an AC output voltage on two output terminals. Outputs of the single phase matrix converter modules in one phase bank are combined with each other to obtain a desired output voltage which is higher than any individual output voltage of a single matrix converter module. The output of each phase bank which is a variable voltage and variable frequency output is then supplied to a load. Three-phase power conversion is achieved by connection of the outputs of three phase banks in a "Wye" or "Delta" configuration. The matrix converter modules which are within each of the phase banks are controlled in a coordinated fashion by a controller.

In operation, an isolated fixed voltage and fixed frequency three phase power is supplied to first, second, and third phase banks. Each of the phase banks include a plurality of the substantially identical single phase matrix converter modules having three inputs and two outputs. A first phase, second phase and third phase of the isolated fixed voltage and fixed frequency three-phase power is supplied to respective first, second, and third inputs of each of the plurality of matrix converter modules in each of the phase banks. A single phase output is generated on output terminals of each of the plurality of matrix converter modules, and modules in the first phase bank are interconnected with each other to thereby generate a single-phase variable voltage and variable frequency output with a voltage amplitude greater than any single module output voltage of the phase bank. Similarly, matrix converter modules in the second and third phase banks are interconnected to also form single-phase variable voltage and variable frequency outputs greater than any single matrix converter module in a corresponding phase bank. The outputs of the phase banks are then connected to a multi-phase load. The outputs from the phase banks and/or modules can be interconnected with each other in series to increase the output voltage or in parallel to increase the output current. In a parallel configuration, two phase banks and/or modules are interconnected at each time through a current sharing inductance. Additionally, the switching configuration in each of the single-phase matrix converter modules use bi-directional and four-quadrant semiconductor switches.

DETAILED DESCRIPTION OF THE PREFERRED EMBODIMENT

Figure 1:
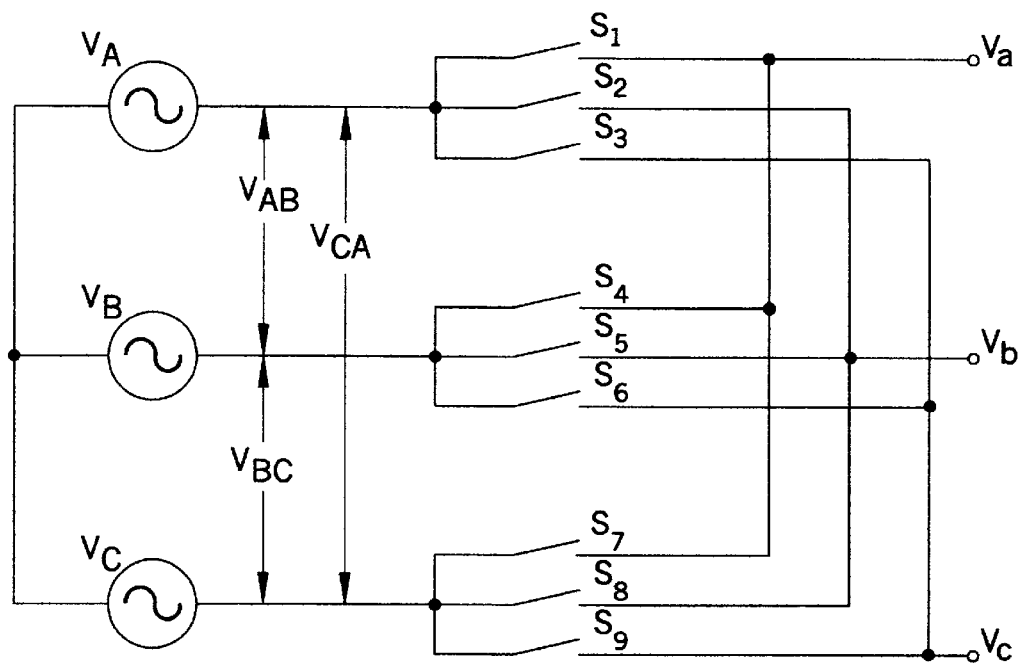
FIG. 1 provides a schematic diagram of a prior art AC—AC matrix converter.
Figure 2:
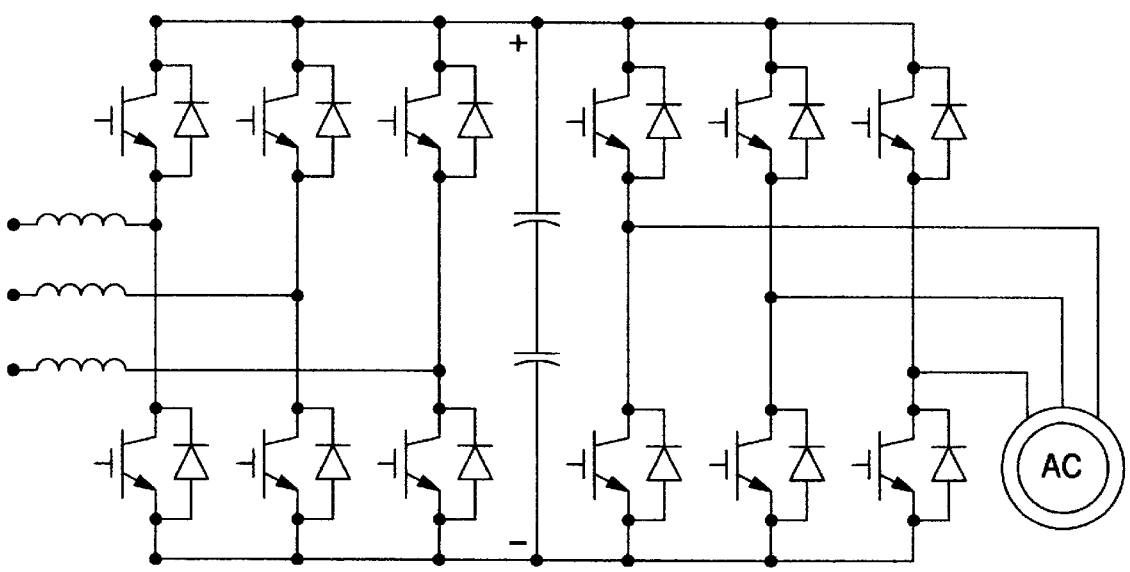
FIG. 2 illustrates a circuit diagram of a combined PWM rectifier and PWM inverter.
Figure 3A:
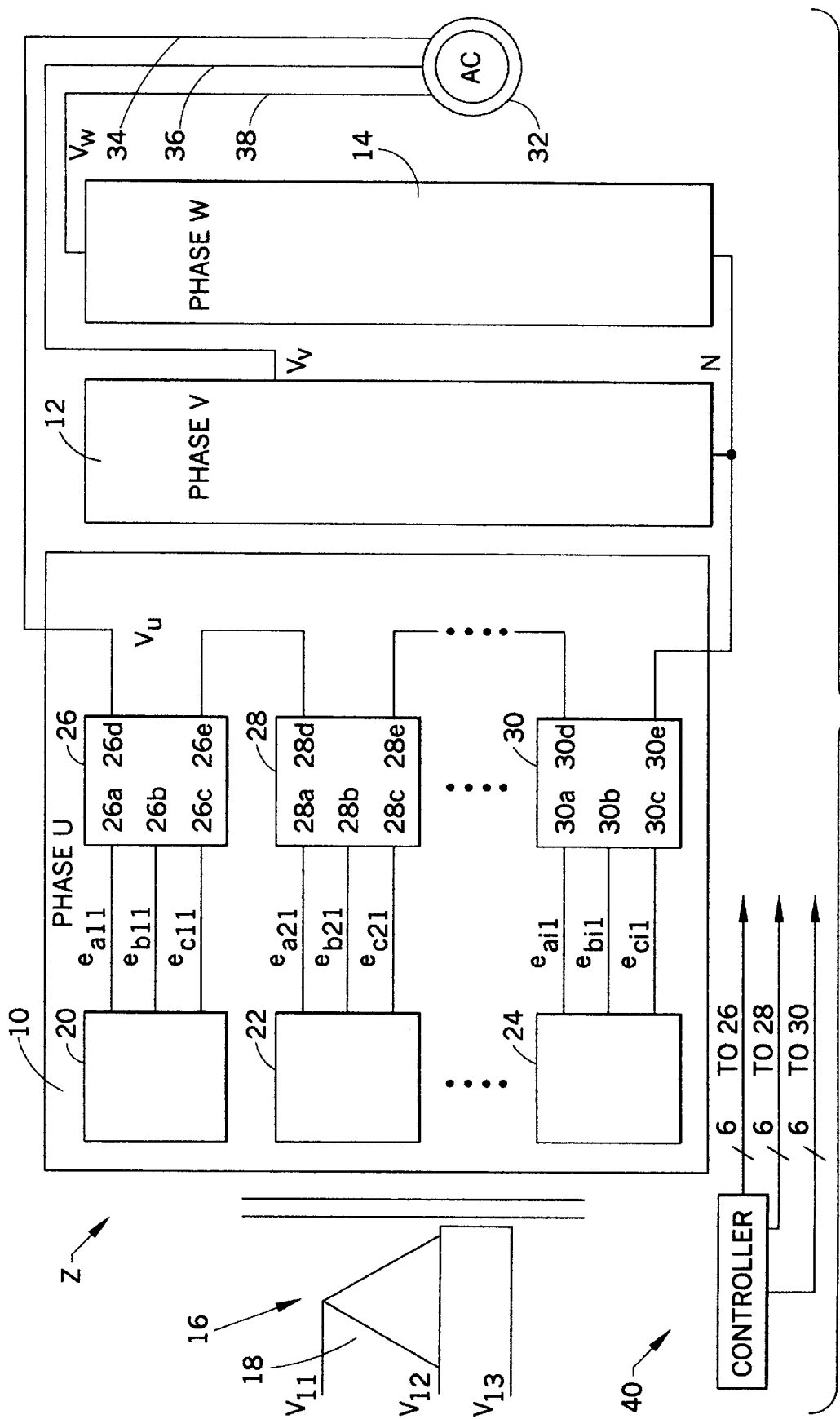
FIGS. 3a–3b provide block diagrams of a multi-module matrix AC—AC converter AC drive for high voltage and high current respectively according to the subject invention.

The multi-module matrix AC—AC converter Z of FIG. 3a includes phase banks, phase-U 10, phase-V 12 and phase-W 14. The configuration of phase-V and phase-W are identical to that of phase-U. Transformer 16 includes primary side 18 and secondary windings 20–24 which are associated with each of the power modules. In FIG. 3a only phase-U 10 shows these windings, however, it is to be appreciated that both phase-V 12 and phase-W 14 are each electrically connected to their own secondary windings which have the same configuration as those of phase-U, of transformer 16. The configuration includes that each phase bank is fed by an individual three-phase power transformer with multi-windings in the secondary.

As illustrated in FIG. 3a, the power supplied to phase-U 10 is from first isolated secondary windings 20, second isolated secondary windings 22 and ith isolated secondary windings 24 from the three-phase transformer 16. These isolated secondary windings are associated with the AC—AC modular matrix converter modules 26, 28 and 30. Each of the isolated secondary windings 20–24 supply three-phase power to an associated matrix converter module 26–30. For example, the first isolated secondary windings 20 supply outputs $e_{a11}$, $e_{b11}$ and $e_{c11}$ to matrix converter module 26. Similarly, the second isolated secondary windings 22 supply outputs $e_{a21}$, $e_{b21}$ and $e_{c21}$ to matrix converter module 28, and the ith isolated secondary windings 24 supply matrix converter module 30 with the outputs $e_{ai1}$, $e_{bi1}$ and $e_{ci1}$. The matrix converter modules 26–30 are each designed with three input terminals 26a–26c, 28a–28c and 30a–30c to receive the input power from isolated secondary windings 20–24.

Each matrix converter module 26–30 also includes two outputs 26d–26e, 28d–28e and 30d–30e. By this arrangement the AC—AC matrix converter modules 26–30 receive three-phase input power which is converted into a single phase output at respective output terminals 26d–26e, 28d–28e and 30d–30e. It is to be appreciated that these modules can also be made to allow conversion of the three-phase input power to multi-phase output power as shown in FIG. 3a. Further, phase-V 12 and phase-W 14 each include matrix converter modules which are identical in their power circuit construction and therefore the modules in each of the phases are interchangeable.

In FIG. 3a, the AC—AC matrix converter modules 26–30 are connected in series with 30e connected to ground or neutral N and 26d connected to load 32 through output line 34. Therefore, the output from phase-U 10 produces a single phase output whose voltage value is much greater than any of the individual modules 26–30. Particularly, as they are configured in a series arrangement, the output voltage of the combination is summed. Such an arrangement allows modules constructed of low voltage components to be combined for use in high voltage requirements which would otherwise not be obtainable or would require expensive specially constructed high voltage components.

With further attention to FIG. 3a, phase-V 12 will output, similar to phase-U 10, a single phase output to load 32 via output line 36 and phase-W 14 will output a single phase output to load 32 via output line 38. The outputs of phase banks 10–14, though each outputting single phase power, will be out of phase by $2\pi/3$ with each other. Therefore, three-phase power conversion can be achieved by the connection of the outputs 34–38, of each of the single phase converter banks 10–14, in "Wye" or "Delta" configurations. Additionally, though FIG. 3a illustrates a multi-module matrix AC—AC converter Z with three phase banks 10–14, it is to be appreciated that the subject invention is not limited to this number of phase banks.

Figure 12:
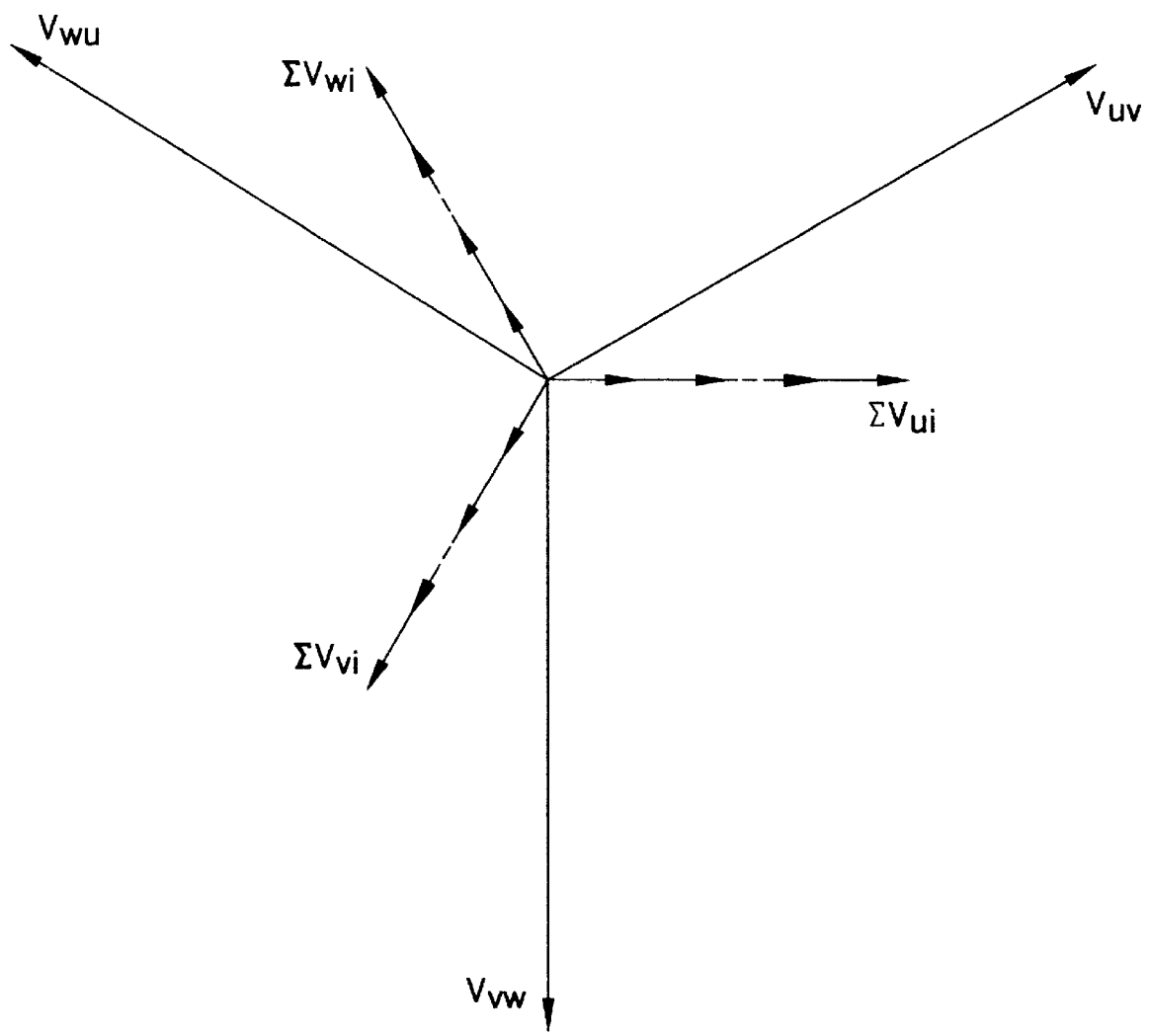
FIG. 12 illustrates a phasor diagram of the fundamental voltages produced by the subject three phase modular AC—AC converter system.

Also illustrated by FIG. 3a is that each of the AC—AC matrix converter modules 26–30 and the corresponding matrix converter modules (not shown) in phase banks 12 and 14 are controlled by electronics controller 40 in a coordinated fashion so as to produce desired voltages as shown in the phasor diagram in FIG. 12. Fiber optic isolated interface links the controller hardware with bi-directional switches in each of the power modules. The practical design of controllers and PWM scheme may have variations in particular hardware and software implementation. However, the design and control will remain the same according to the subjected invention. These controllers and PWM techniques are within the proficiency skill in the art and therefore will not be expanded upon.

Figure 3B:
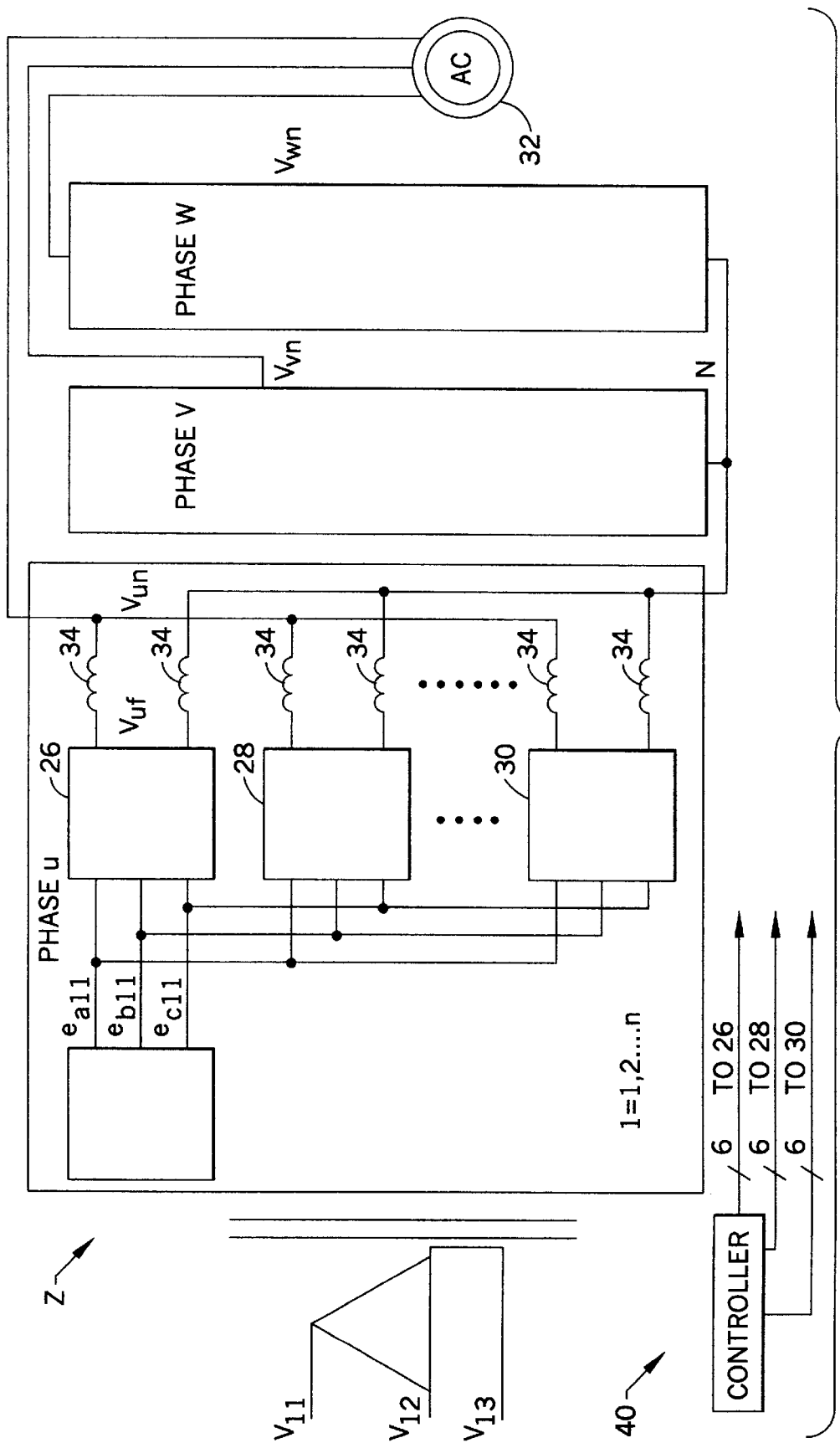

FIG. 3b is another embodiment of the multi-module matrix AC—AC converter Z of FIG. 3a. Matrix converter modules in phase-U are shown connected in parallel. In this arrangement converter modules 26–30 are connected in parallel through current sharing inductances 34. By such a construction an increased current output is possible for load 32 from phase bank U. Phase banks V and W may be constructed in a similar manner. The remainder of the operation and construction of AC converter Z of FIG. 3b is similar to that of FIG. 3a.

Figure 4:
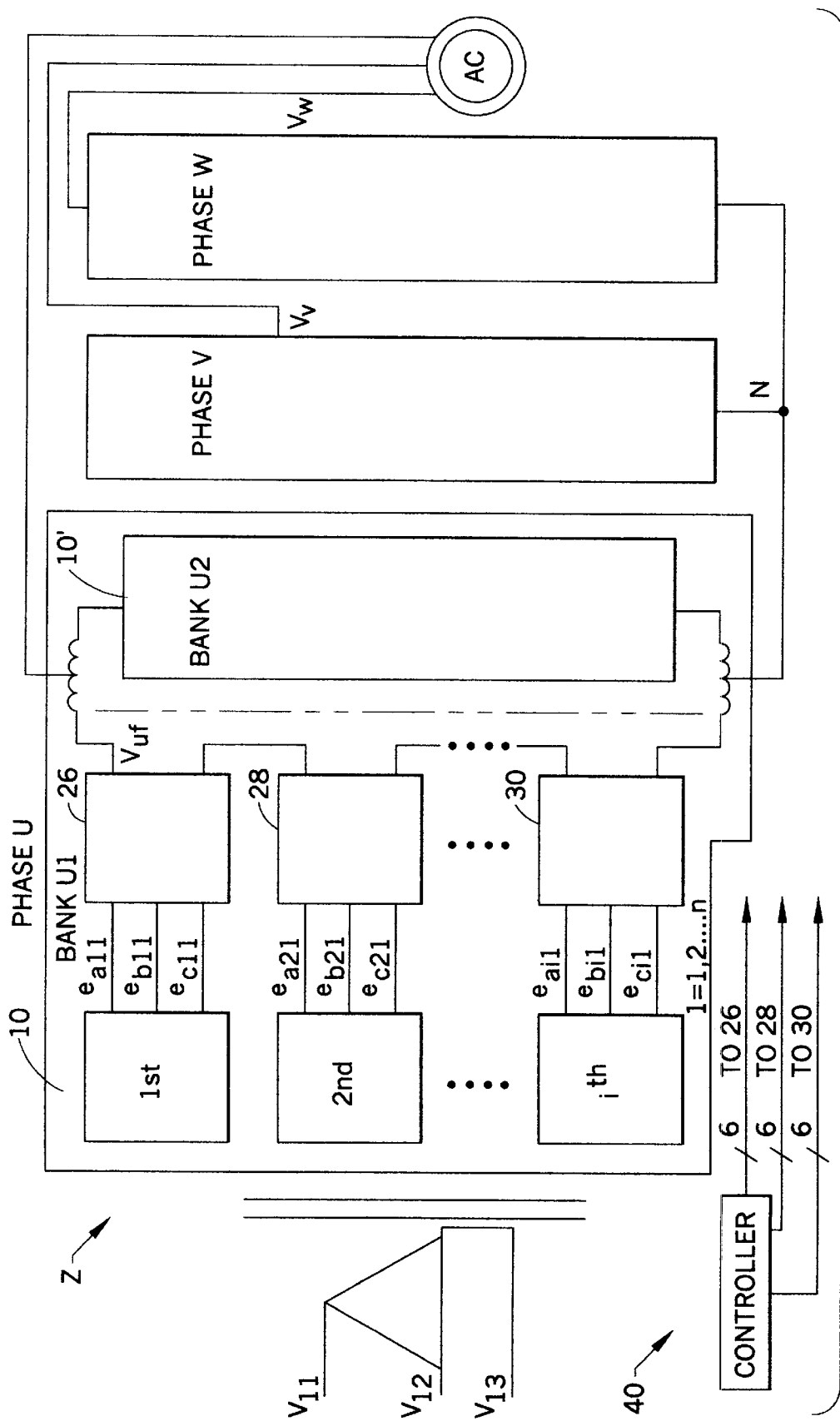
FIG. 4 provides a block diagram of a multi-module matrix AC converter with paralleled phase bank according to the present invention implemented for high current output.

FIG. 4 is still another embodiment of the multi-module matrix AC—AC converter Z of FIG. 3b. However, a distinction between this converter and the converter of FIG. 3a is that two matrix converter banks 10–10' are interconnected in parallel through an inductance arrangement. Therefore, in this embodiment the output of combined phase banks 10–10' have an increased current output. Three of the combined-single-phase converters can be connected in "Wye" or "Delta" to provide a three-phase system. This illustrates the flexible nature of the subject power converter which can be used for both high load conditions with voltage and current.

Figure 5A:
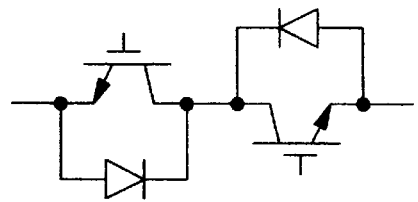
FIGS. 5a–5b provide two configurations of four-quadrant power switches in common-collector and common-emitter connection using IGBT devices.
Figure 5B:
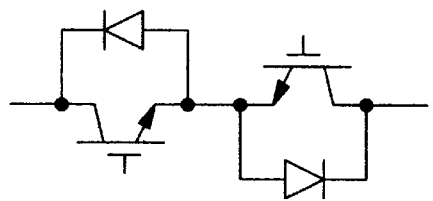

FIGS. 5a–5b present two configurations of bi-directional power switches, using two IGBT devices in common collector and common emitter arrangements. The switching devices in these figures can be replaced by other types of self-turn off semiconductor devices such as GTOs, MCTs, MOSFETs, or any other suitable semiconductor switching device.

Figure 6A:
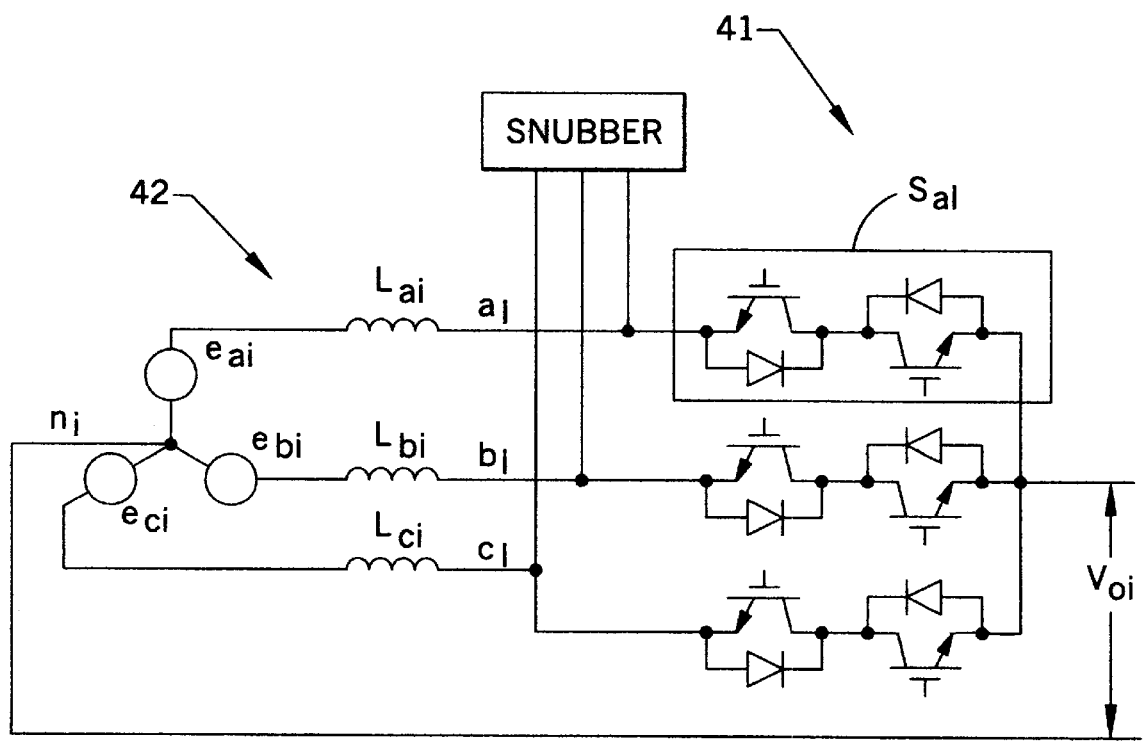
FIGS. 6a–6b provide circuit diagrams of two types of single phase AC—AC matrix converter modules which can be used in the multi-module matrix AC—AC converter of FIGS. 3 and 4.

FIG. 6a shows a circuit 41 which is a basic building block of a three-phase to single-phase modules 26–30 of AC—AC converter Z.

Figure 7A:
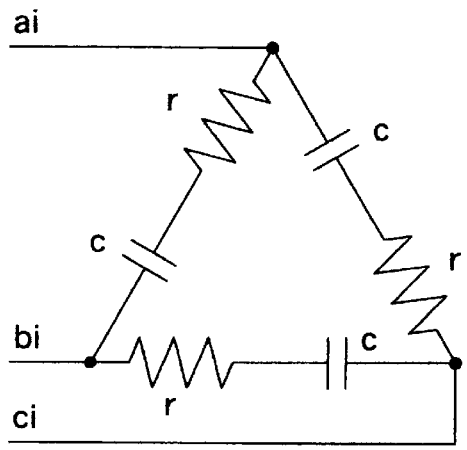
FIGS. 7a–7b depict two snubber circuit configuration embodiments used in the circuits of the subject invention.
Figure 7B:
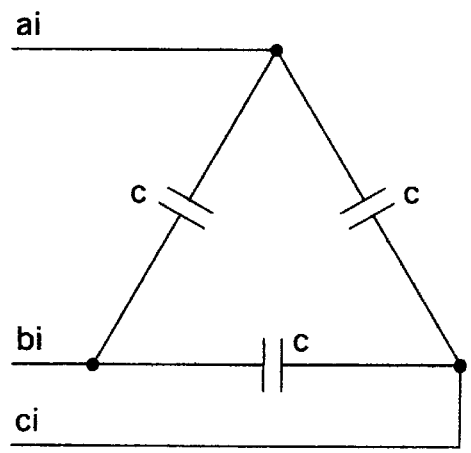

Two embodiments of snubber circuit configurations which may be used in circuit are shown in FIGS. 7a–7b, though other snubber type circuits are contemplated.

Returning attention to FIG. 6a, the circuit in FIG. 6a is supplied with $$e_{ai} = A \sin\left(2\pi f_0 t + \frac{\pi}{3}\right) \quad (1)$$

$$e_{bi} = A \sin\left(2\pi f_0 t - \frac{\pi}{2}\right) \quad (2)$$

and $$e_{ci} = A \sin\left(2\pi f_0 t - \frac{7\pi}{6}\right) \quad (3)$$

where A is the amplitude of the line-to-neutral voltage of an isolated three-phase input power supply 42 and $f_0$ is the power supply frequency. A modulation reference signal can be given for the sinusoidal pulse width modulation (PWM) to obtain a variable voltage and variable frequency output.

The normalized output voltage of circuit 41 is set forth as:

$$V_{io} = \frac{M_i V_{iom}}{A} \sin(2\pi f_1 t + \phi_1) \quad (4)$$

where
$M_i$: modulation index
$f_1$: output fundamental frequency
$\phi_1$: arbitrary phase angle of the fundamental component of the output voltage.
$V_{iom}$: the maximum output voltage amplitude which is obtainable by a PWM scheme.
A: the input phase voltage amplitude.

Figure 6B:
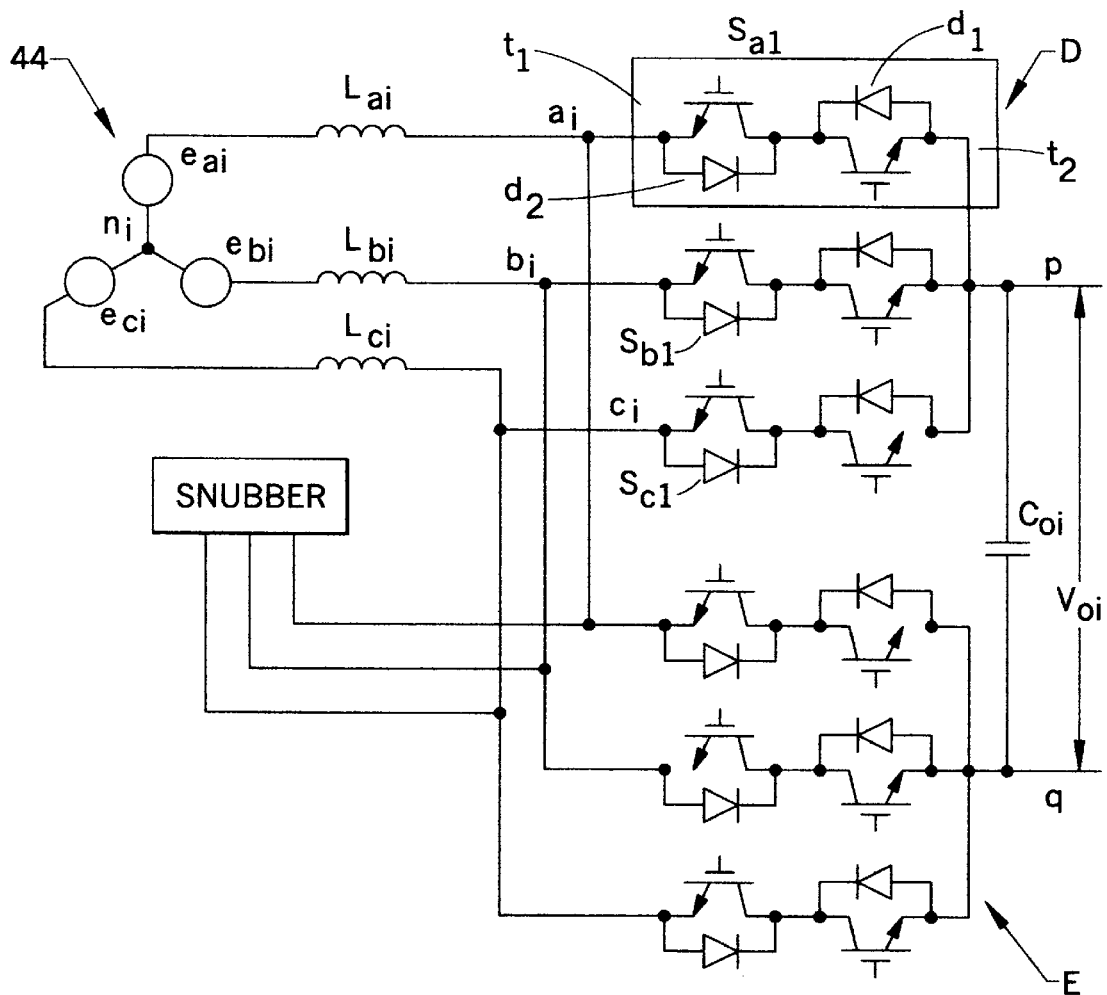

FIG. 6b discloses a single-phase differential AC—AC converter circuit 46 which may also be implemented in modular form such as in modules 26–30 of FIGS. 3a, 3b or 4. As previously noted each of the modules in the AC—AC converter Z will be operationally identical. As shown in FIG. 6b, an output of an isolated three-phase fixed voltage and fixed frequency power supply 44 is supplied to converter circuit 46. The circuit is composed of the power circuit blocks D and E which are identical in circuit construction. However, the sinusoidal reference signals applied to control blocks D and E have a phase angle difference of $\phi_d$, in particular:

$$V_{rD} = \frac{M_i V_{iom}}{A} \sin(2\pi f_1 t - \phi_1) \quad (5)$$

$$V_{rE} = \frac{M_i V_{iom}}{A} \sin(2\pi f_1 t - \phi_1 - \phi_d) \quad (6)$$

where, $-180° < \phi d \leq 180°$.

The resulting normalized fundamental voltage output is thus obtained by:

$$V_{oi} = V_{pni} - V_{qni} = \frac{M_i V_{iom}}{A} [\sin(2\pi f_1 t - \phi_1) - \sin(2\pi f_1 t - \phi_1 - \phi_d)] \quad (7)$$

$$= \frac{2M_i V_{iom}}{A} \sin\left(\frac{\phi_d}{2}\right) \cos\left[\left(2\pi f_1 t - \phi_1 - \frac{\phi_d}{2}\right)\right]$$

where A is the voltage amplitude of the input power source.

The output voltage achieves the maximum amplitude when $\phi_d = \pi$, which is twice the voltage amplitude obtained in FIG. 6a, and where $$V_{oimax} = \frac{2V_{iom}}{A} M_i \sin(2\pi f_1 t - \phi_1) \quad (8)$$

Nevertheless, the power switching device in FIG. 6(b) withstands the same input line-to-line voltage as in FIG. 6(a), $$V_{dmax} = \sqrt{6} A \quad (9)$$

where A is the amplitude of the input phase voltage.

Figure 8A:
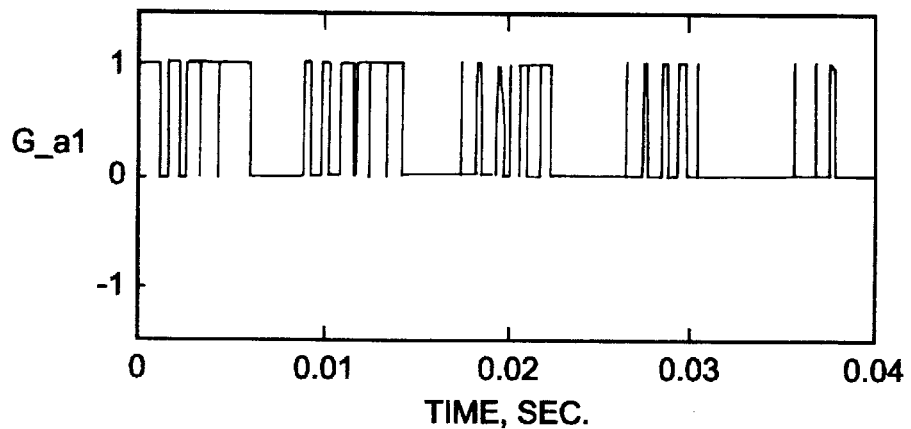
FIGS. 8a–8e illustrate output waveforms of the circuit in FIG. 6b.
Figure 8B:
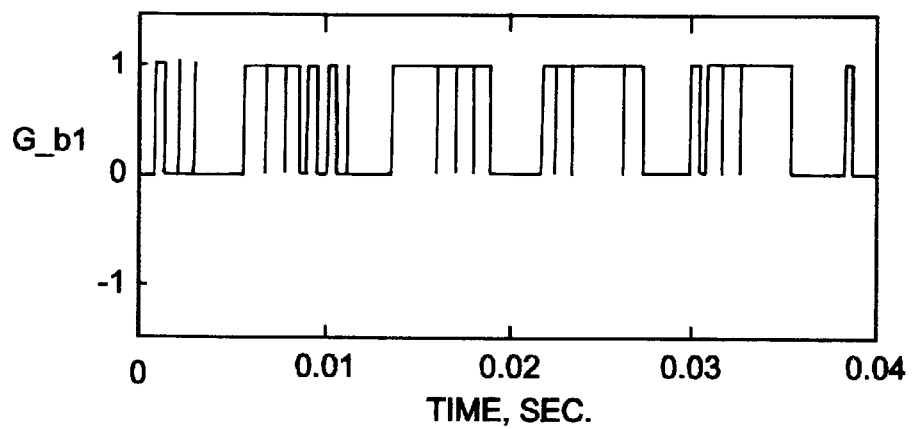
Figure 8C:
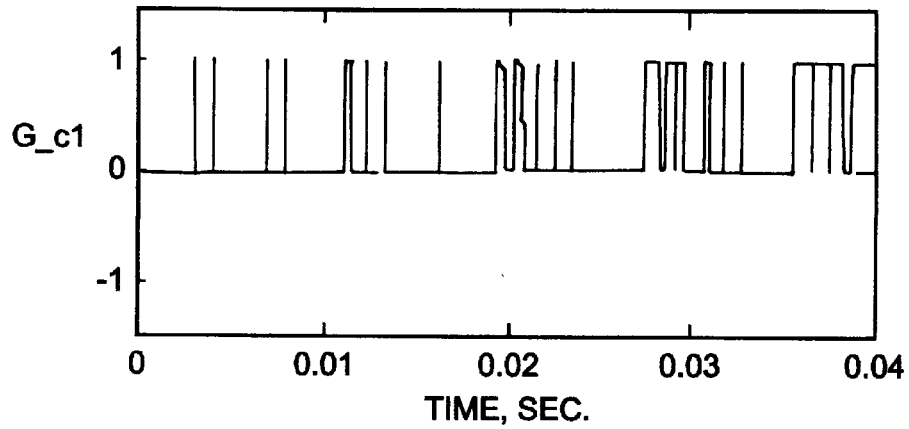
Figure 8D:
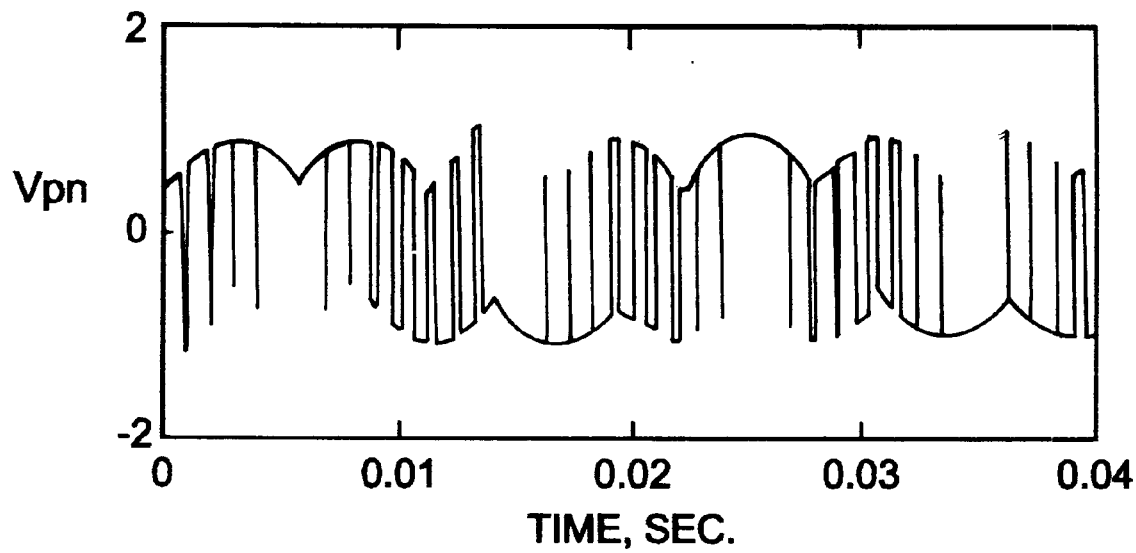
Figure 8E:
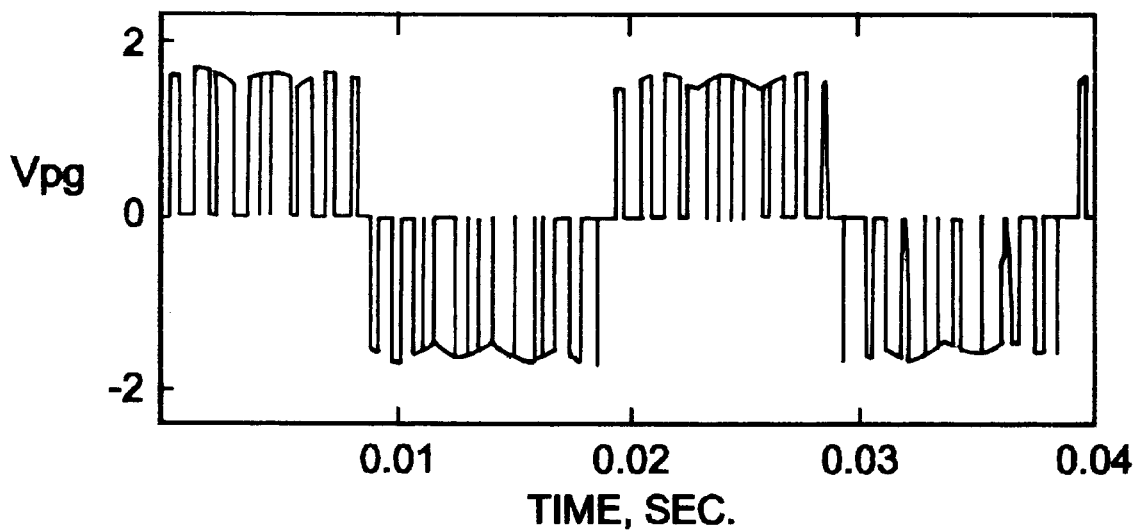

The gate signals and voltage waveforms which correspond to the operation of circuit 46 are illustrated in FIGS. 8a–8e, when the circuit is operating under the parameters of $f_1 = 40$ Hz, $M_i = 0.95$, and $\phi_d = \pi$. FIG. 8a illustrates the gate pulse for the switch $S_{a1}$ in block D associated with phase $a_i$. The switch being in an on state when the gate signal $Ga_1$ is shown as "1" and in an off state when the gate signal is at 0. Similarly, FIGS. 8b and 8c respectively show the gate switching in block D for the switches $S_{b1}$ and $S_{c1}$ associated with phases $b_i$ and $c_i$. FIG. 8*d* displays the waveform of the output voltage $V_{pni}$ of block D, between the output p and neutral of the transform $n_i$. FIG. 8*e* illustrates the voltage differential $V_{pq}$ between the output p from block D and output q from block E.

In FIG. 6*b*, power supply 44 is functionally equivalent to secondary windings 20–24 of FIGS. 3*a*, 3*b* and 4, and converter 46 is representative of circuitry that may be found in matrix converter modules 26–30. As illustrated by the circuitry of FIG. 6*b*, in addition to three inputs $a_i$, $b_i$ and $c_i$ in block D (as well as three inputs in block E) the circuit includes two outputs P and q. In this particular implementation, the transistors $t_1-t_2$ and diodes $d_1-d_2$ act together as bi-directional four quadrant switches $Sa_1$. Similar arrangements are provided for remaining switches in blocks D and E, which are controlled to provide a bi-directional current flow.

It is to be appreciated that while circuit 46 is capable of generating higher outputs useful in the subject converter, optimal commutation sequence control between outgoing AC switch and incoming AC switch can reduce the switching losses and the switching stress of the power devices. For a more detailed discussion of optimal commutation control for circuits 41 and 46, applicant directs the reader's attention to co-pending U.S. patent application Ser. No. 08/867,125 filed Jun. 2, 1997, entitled "Adaptive Overlapping Commutation Control of Modular AC—AC Converter and Integration with Device Module of Multiple AC Switches", by the same inventor, Jie Chang, and incorporated herein by reference.

Figure 9:
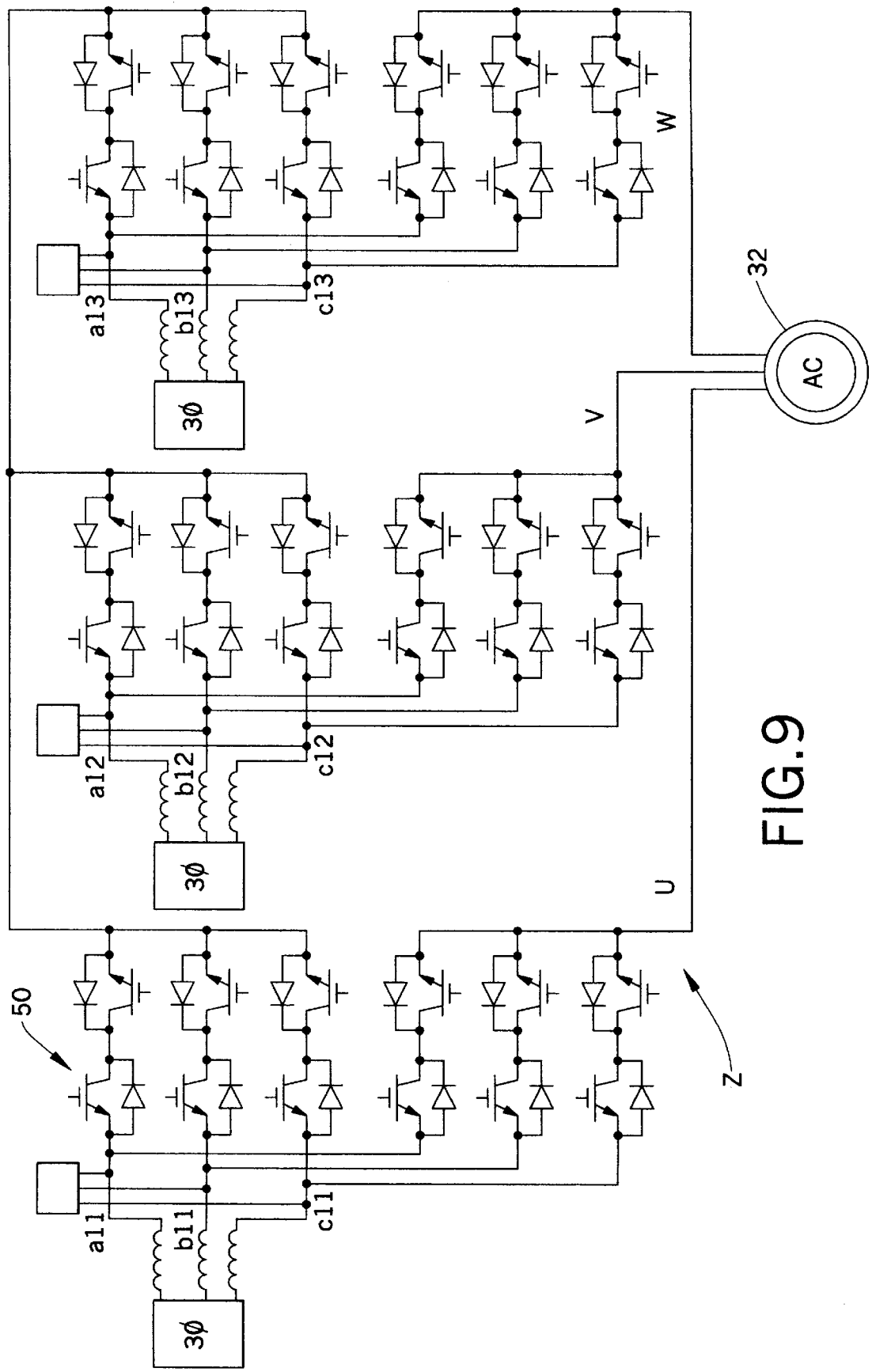
FIG. 9 provides a modular differential AC—AC converter fed AC motor drive (i=1) according to the subject invention. Since there is no power modules are connected in series in each phase in this basic configuration, it is possible to feed the three-phase converter from a standard three-phase transformer.

FIG. 9 discloses a circuit which is in a reduced dimension of the multi-module AC—AC converter Z, using the differential modular converters. Particularly, FIG. 9 shows modules which may be incorporated in the corresponding phases, phase-U, phase-V and phase-W of FIGS. 3*a*, 3*b* and 4. As illustrated in FIG. 9 the output of the left most differential circuit 50 includes an output U to AC motor 32 and an output to neutral N. A middle differential circuit includes an output V to AC motor 32 with another output to neutral N, and a third differential circuit has an output W to motor 32 and an output to neutral N.

Figure 10:
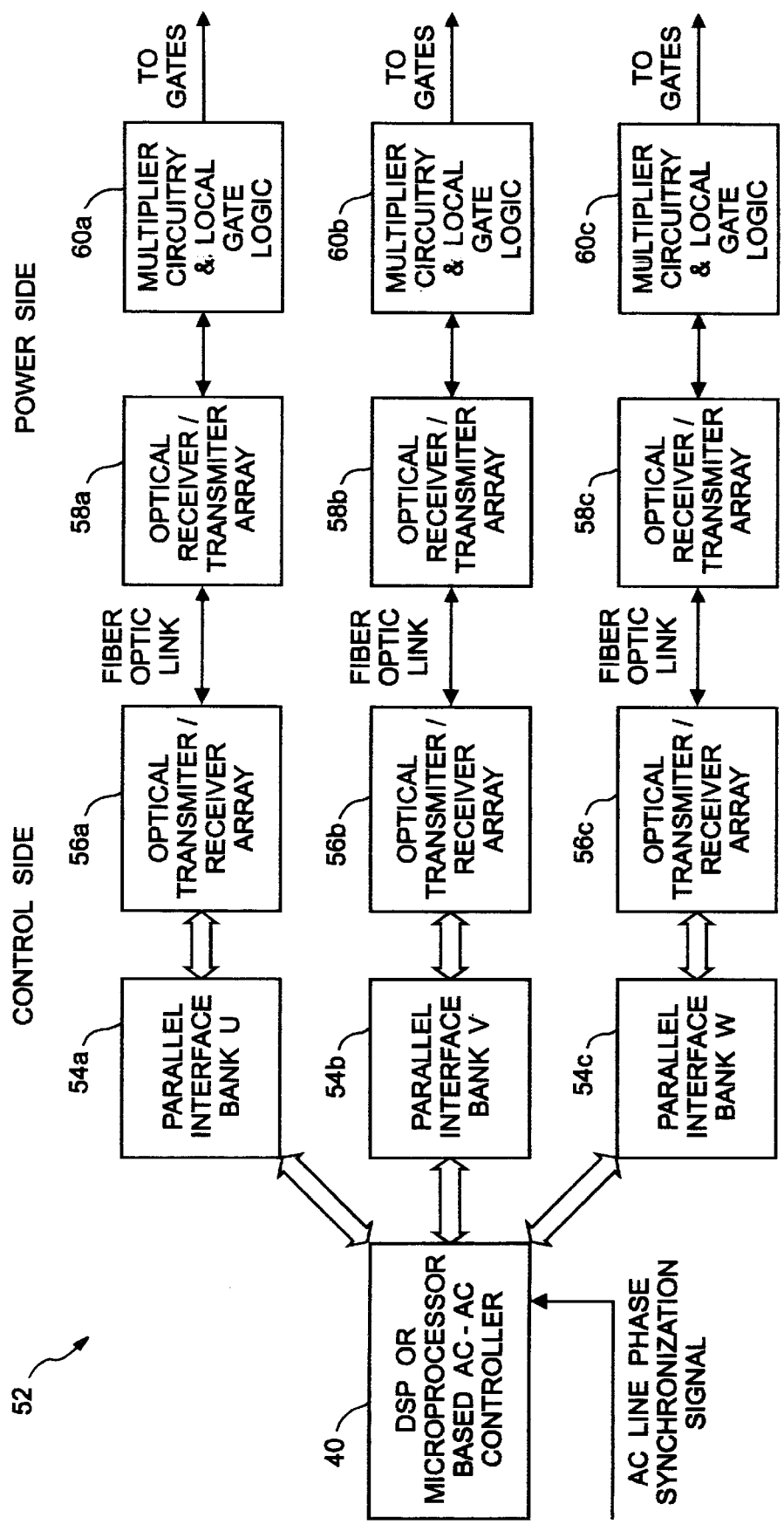
FIG. 10 provides a block diagram of the multi-module gate control for a circuit according to the subject invention.

FIG. 10 provides a self-explanatory block diagram of multi-module gate control circuit 52 including controller 40, according to the subject invention. This figure emphasizes that bi-directional signal flow is provided to allow signals to be sent from the control side to the power side, and for feedback of protection signals from the power side to the control side. This figure also discloses fiber optic interconnections or links, employing parallel interfaces 54*a*–54*c*, optical transmitter/receiver arrays 56*a*–56*c*, optical receiver/transmitter arrays 58*a*–58*c* and multiplier circuitry and local gate logic 60*a*–60*c*, to obtain dielectric isolation between the control side of the circuit and the power side.

Figure 11A:
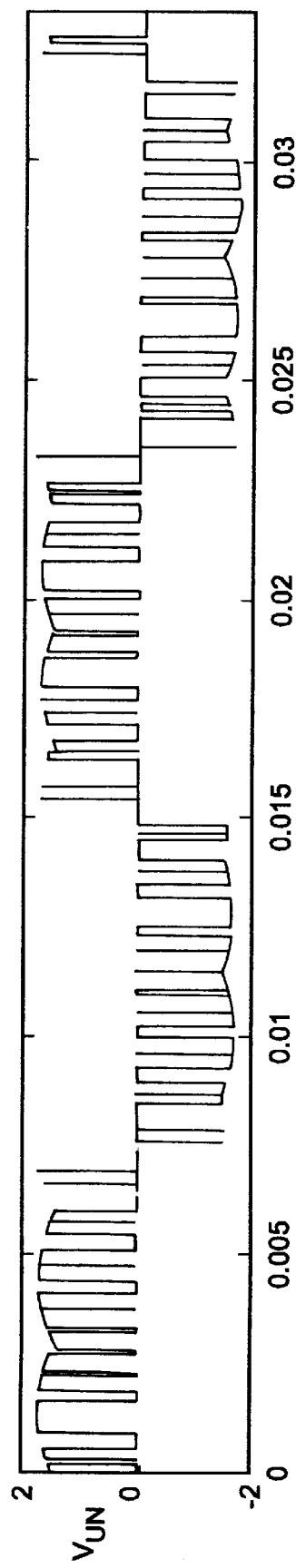
FIGS. 11a–11d illustrates the voltage waveforms and harmonic spectrum of the one-level (i=1) modular differential AC—AC converter of FIG. 9.
Figure 11B:
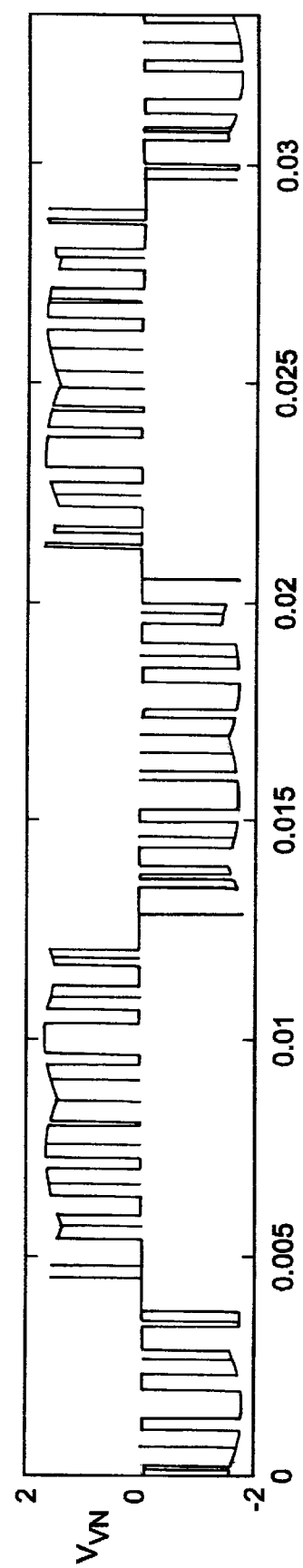
Figure 11C:
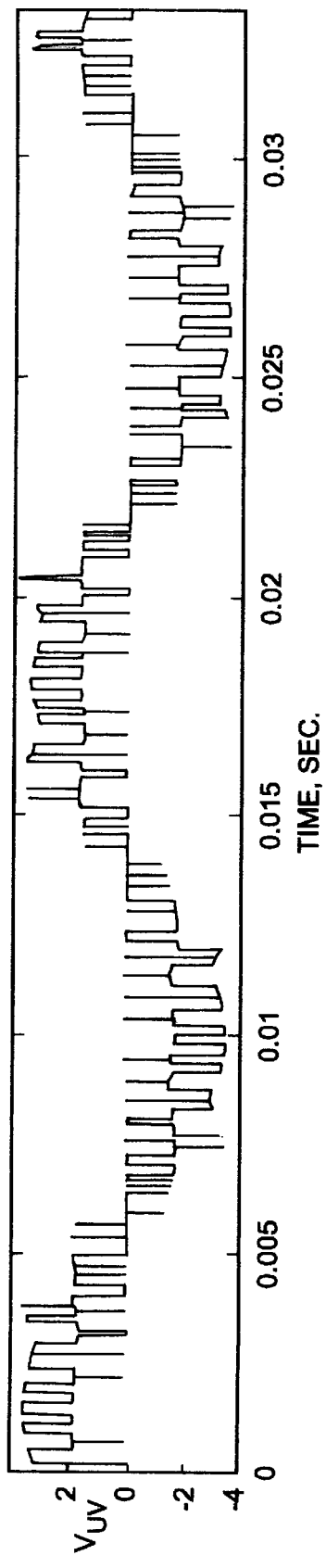
Figure 11D:
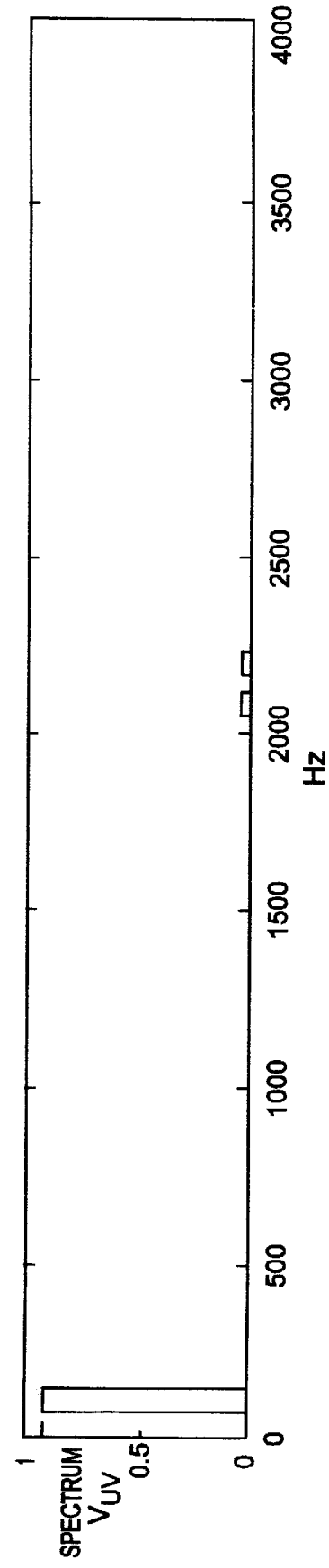

Waveforms corresponding to the operation of a multi-level AC—AC converter according to the subject invention, with an output fundamental frequency $f_1$ of 60 Hz, a modulation index $M_i$ of 1 and, a switching frequency $f_s$ of 1050 Hz are shown in FIGS. 11*a*–11*d*. FIG. 11*a* illustrates the voltage output $V_{UN}$ from the phase bank-U to neutral. FIG. 11*b* shows the voltage output $V_{VN}$ output of phase bank-V to neutral and FIG. 11*c* depicts the voltage output $V_{UV}=V_{UN-VVN}$ across phase U and phase V. FIG. 11*d* provides the voltage spectra of $V_{UV}$ with a normalized amplitude with respect to the individual AC input voltage. As can be noted, at a fundamental frequency of 60 Hz the normalized output is 100% and as the frequency increases there is a sharp decrease in the harmonic components. The first group of side-band harmonics with non-negligible amplitude is shifted to twice the switching frequency. The line-line voltage waveform in the time domain illustrates five-step changes in the sinusoidal modulation, which reduces the dv/dt stresses on the motor stator windings.

The waveforms in FIGS. 11*a*–11*d* also illustrate that by using the modularity concepts of for example FIG. 9, power components which would otherwise only be able to generate one half the desired output are combined in a such a manner that a desired high output voltage is obtained. It is to also be appreciated that as shown in FIGS. 3*a* and 3*b*, the modules in each phase may also be configured in series or parallel, to increase the output of the phase banks. Therefore, the modular construction of the subject invention allows for the use of lower rated less expensive components to be used in conjunction with high rated loads. It should be appreciated that the subject invention covers a plurality of modules within each phase bank. It should be also appreciated that in fixed-frequency converter and inverter applications, a multiple step voltage output waveform can be conveniently obtained by this multi-module structure by a simple multiple-step voltage control, as an alternative to the PWM control of each power modules.

FIG. 12 illustrates a phasor diagram further illustrating three-phase modulation in a "Wye" configuration. The output of the fundamental voltage in phase-U is noted as being $V_u=V_1 \sin(\omega t)$. The output of phase-V is shown as $V_u=V_1 \sin(\omega t-120°)$ 62 and the output of phase-W is set forth as $V_u=V_1 \sin(\omega t-240°)$ 64. This phasor diagram shows that each of the phase banks 10–14 are single phase, displaced from each other by 120°. The "Wye" connection having an advantage of gaining $\cdot 3$ output voltage. It is noted that the power device will see the phase to neutral voltage in such a "Wye" connection, as shown in FIG. 9.

While particular embodiments of the present invention have been shown and described, it should be clear that changes and modifications may be made to such embodiments without departing from the true scope and spirit of the invention. It is intended that the appended claims cover all such changes and modifications.

We claim:

1. A multi-module AC—AC power converter for converting fixed voltage and fixed frequency isolated multi-phase power to an integrated variable-voltage and variable-frequency multi-phase output with multiple power ratings which is to be supplied to a load, the AC—AC power converter comprising:
   a plurality of phase banks each of which is a multi-phase input single phase output pulse width modulated AC—AC power converter, each phase bank including,
      a plurality of operationally identical single phase converter modules which have three input terminals and two output terminals which input the fixed voltage and fixed frequency isolated multi-phase power and outputs variable voltage and variable frequency power, the outputs of each of the single phase converter modules within a same phase bank interconnected with each other to sum the output of individual matrix converter modules of the plurality.

2. The AC—AC power converter according to claim 1 wherein the plurality of phase banks include first, second, and third phase banks connected to a load requiring three phase power.

3. An AC—AC power converter which receives fixed voltage and fixed frequency three phase power from a three phase power supply and supplies a variable voltage and variable frequency output to a load, the AC—AC power converter comprising:

a phase bank connected to receive the three phase power from the three phase power supply, the phase bank including, a plurality of operationally identical single phase converter modules which input the fixed frequency fixed amplitude isolated three phase power, each module having three input terminals and two output terminals, the outputs of the modules interconnected to each other to combine the individual output of each of the modules to obtain an output of a larger value than that of any one module of the plurality.

4. The AC—AC power converter according to claim 3 wherein each of the operationally identical modules include bi-directional four-quadrant semiconductor switches.

5. The AC—AC power converter according to claim 3 wherein each of the modules have circuit topologies of a single phase AC—AC converter.

6. The AC—AC power converter according to claim 3 wherein the power converter is configured in a differential arrangement which increase the output voltage by approximately 15.5% in comparison with a non-differential three phase pulse width modulated arrangement.

7. The AC—AC power converter according to claim 3 wherein the power converter is configured in a three phase arrangement.

8. The AC—AC power converter according to claim 7 wherein there are three phase banks whose outputs are connected to the load in a Wye configuration to gain $\sqrt{3}$ times of the output line-to-line voltages.

9. The AC—AC power converter according to claim 7 wherein there are three phase banks whose outputs are connected to the load in a Delta configuration.

10. The AC—AC power converter according to claim 3 further including a controller circuit including a fiber optical link, the controller circuit connected to control each of the bi-directional switches of the modules in the phase bank in a coordinated fashion.

11. The AC—AC power converter according to claim 3 wherein the modules are interconnected to each other in a series arrangement which increases voltage output of the phase bank.

12. The AC—AC power converter according to claim 3 wherein the modules or banks are interconnected to each other in a parallel arrangement which increases current output of the phase bank.

13. The AC—AC power converter according to claim 3 wherein each module is configured to receive the three-phase power inputs, and configured to output single-phase power.

14. The AC—AC power converter according to claim 3 wherein the isolated three phase power supply supplying three phase power to the module is a set of transformer secondary windings.

15. The AC—AC power converter according to claim 14 wherein each set of three-phase secondary windings are di-electrically isolated from other sets.

16. The AC—AC power converter according to claim 14 wherein when n modules are in serial connection in a phase bank, each module will be rated at least equal to 1/n the total rating necessary for a predetermined load requirement, wherein the total load requirement is achieved by summation of the output voltages of each of the modules.

17. A method of converting electrically isolated fixed voltage and fixed frequency three phase power from a three phase power supply to a variable voltage and variable frequency output using an AC—AC power converter, the method comprising the steps of:

supplying isolated fixed voltage and fixed frequency three phase power to first, second, and third phase banks;

providing each of the phase banks with a plurality of operationally identical converter modules having three input terminals and two output terminals;

supplying a first phase, second phase, and third phase of the isolated fixed voltage and fixed frequency three phase power to respective first, second, and third inputs of each of the plurality of converter modules in each of the phase banks;

generating from each of the plurality of converter modules single phase variable-voltage and variable-frequency output power;

interconnecting the converter modules in the first phase bank to generate a single phase variable voltage and variable frequency output greater than any single converter module output;

interconnecting the converter modules in the second phase bank to generate a single phase variable voltage and variable frequency output greater than any single converter module output;

interconnecting the converter modules in the third phase bank to generate a single phase variable voltage and variable frequency output greater than any single converter module output; and, connecting the outputs from the phase banks to a load.

18. The method according to claim 17 wherein the steps of interconnecting include interconnecting for each of the phase banks the converter modules within the phase banks in series with each other, to increase the voltage output.

19. The method according to claim 17 wherein the steps of interconnecting include interconnecting for each of the phase banks the converter modules within the phase banks in parallel with each other, and interconnecting the phase banks in parallel, to increase the current output.

20. The method according to claim 17 wherein the step of connecting the outputs of the phase banks to the load, include connecting the phase banks to the load in at least one of Wye or Delta configurations.

* * * * *